(12) United States Patent
Luque

(10) Patent No.: US 12,436,399 B2
(45) Date of Patent: Oct. 7, 2025

(54) MULTI-WAVELENGTH LASER BEAM HOMOGENIZER-EXPANDER LIGHT ENGINE

(71) Applicant: LaserWorld AG, Lengwil (CH)

(72) Inventor: Jordi Luque, Valley (DE)

(73) Assignee: LaserWorld AG, Lengwil (CH)

(*) Notice: Subject to any disclaimer, the term of this patent is extended or adjusted under 35 U.S.C. 154(b) by 0 days.

(21) Appl. No.: 18/869,366

(22) PCT Filed: May 17, 2023

(86) PCT No.: PCT/EP2023/063312
§ 371 (c)(1),
(2) Date: Nov. 26, 2024

(87) PCT Pub. No.: WO2023/232483
PCT Pub. Date: Dec. 7, 2023

(65) Prior Publication Data
US 2025/0110342 A1  Apr. 3, 2025

(30) Foreign Application Priority Data
May 29, 2022  (EP) .................................... 22175968

(51) Int. Cl.
*G02B 27/09* (2006.01)
*G02B 27/10* (2006.01)
*G02B 27/14* (2006.01)

(52) U.S. Cl.
CPC ..... *G02B 27/0916* (2013.01); *G02B 27/0927* (2013.01); *G02B 27/0961* (2013.01); *G02B 27/1006* (2013.01); *G02B 27/141* (2013.01)

(58) Field of Classification Search
CPC ........ G02B 27/09; G02B 27/10; G02B 27/14; G02B 27/0916; G02B 27/0927;
(Continued)

(56) References Cited

U.S. PATENT DOCUMENTS 6,975,786 B1 * 12/2005 Warr ........................ G02B 5/32
359/559
8,009,358 B2 * 8/2011 Zalevsky ........... G02B 19/0066
359/619

(Continued)

FOREIGN PATENT DOCUMENTS

EP    2 372 471      10/2011
JP    2015-148654    8/2015

OTHER PUBLICATIONS

European Search Report received for European Patent Application No. 22175968.1, mailed on Nov. 24, 2022, 8 pages.
(Continued)

*Primary Examiner* — Jie Lei
(74) *Attorney, Agent, or Firm* — Grüneberg and Myers PLLC

(57) ABSTRACT

A laser beam homogenizer-expander has a first beam shaper element to divide the incident beams into beamlets along the main optical axis, and a second beam shaper element which defines the top-hat intensity distribution output, thus leading to a 2nd homogenization stage. The laser beam homogenizer-expander also has several light diffusers, mirrors, filters, and output lenses to achieve a good homogenization at the desired output angle.

16 Claims, 3 Drawing Sheets

(58) Field of Classification Search
CPC ............ G02B 27/0961; G02B 27/0955; G02B 27/0966; G02B 27/0972; G02B 27/1006; G02B 27/141; G02B 27/28; G02B 27/283; G02B 27/286; G02B 27/30; H01S 5/0071; H01S 5/005; H01S 5/0057; H01S 5/4012
USPC ....... 359/291, 618, 619, 641, 710, 741, 796, 359/719, 800, 834; 362/257, 259, 297
See application file for complete search history.

(56) References Cited

U.S. PATENT DOCUMENTS

2007/0183054 A1   8/2007   Ryzhikov et al.
2013/0235353 A1   9/2013   Kaneda

OTHER PUBLICATIONS

International Search Report received for PCT Application No. PCT/EP2023/063312, mailed on Aug. 17, 2023, 4 pages.
Reinhard Voelkel, "Micro-Optics: Enabling Technology for Illumination Shaping in Optical Lithography", Proc. of SPIE, vol. 9052, Mar. 31, 2014, pp. 90521 U-1-90521 U-11.
Written Opinion received for PCT Application No. PCT/EP2023/063312, mailed on Aug. 17, 2023, 7 pages.

* cited by examiner

MULTI-WAVELENGTH LASER BEAM HOMOGENIZER-EXPANDER LIGHT ENGINE

CROSS-REFERENCE TO RELATED APPLICATIONS

This application is a National Stage entry under § 371 of International Application No. PCT/EP2023/063312, filed on May 17, 2023, and which claims the benefit of priority to European Application No. 22175968.1, filed on May 29, 2022. The content of each of these applications is hereby incorporated by reference in its entirety.

BACKGROUND OF THE INVENTION

Field of the Invention

This invention belongs to the field of laser beam shaping and relates to a laser emission source that is suitable for spectroscopy, material processing, fluorescence, heat treatment, communications, entertainment, and many other applications.

Description of Related Art

Most laser types in current use have an output beam profile with circular or elliptical cross-sections, with either Gaussian or near-Gaussian intensity profile distribution. This is acceptable, and often beneficiary, for many applications in which the laser beam is focused to a small spot. However, there are also many different use cases in which a uniform, equal intensity distribution ("top-hat") is necessary. For example, a uniform intensity distribution ensures that the entire laser impact area is processed evenly in materials processing tasks. It is also valuable in situations where the laser light is primarily used for illumination, as uniform illumination makes identical features that all appear to have the same brightness, regardless of where they are in the illuminated field, which simplifies the image processing task and increases contrast and resolution.

There are several techniques and methods to achieve a uniform distribution pattern. Price-optimized devices with lasers often use Gaussian beams sources that can be physically truncated by an aperture to form a pseudo-flat top profile.

This is inefficient and there is a significant waste of energy in the outer regions of the gaussian profile, but this technical approach helps to minimize complexity and the overall costs of the devices.

Higher performance applications with a higher efficiency demand often use different types of refractive beam shapers, similarly to some part of this invention.

These systems typically use field-mapping phase elements, like aspheric lenses and diffraction elements, to redistribute the irradiance and the phase profile at the same time.

Amplitude and phase of incident beam/s are changed after passing through both elements in a conjugate lens telescope setup.

The emerging beam is of a high efficiency (above 97% performance) and in-dependent of wavelength within the range of the optical setup.

Refractive beam shapers allow for uniform irradiance profile distribution and flat phase fronts.

A laser beam integrator or homogenizer is an optical element typically formed by multiple lenslets (microlenses) which divide the incident laser beam/s into an array of smaller beams or 'beamlets', followed by a lens or other focusing element that superimposes all those beamlets in the target plane.

It can be used with coherent laser sources but with other incoherent light sources as well.

Typically, the final output beam profile is the sum of the diffraction patterns characteristics of the lenslet array.

Most laser beam integrators are used to generate a homogenized top-hat distribution profile from incident Gaussian laser beams or other higher order multi-transverse modes.

SUMMARY OF THE INVENTION

The invention is based on a laser beam integrator and pertains to the refractive beam shaping group; however, it has a unique optical setup mainly due a second-stage integrator, custom engineered diffusers and the overall design for the optic setup and optic mounts.

Each integrator consists of a microlens array, but an engineered surface could be considered as alternative as well, which should achieve good results.

As per the principle of a Köhler integrator, it collects light from a non-uniform laser source within an integration zone and provides uniform irradiance in the Fourier plane of the Fourier lens.

The outer illumination area is a superposition of these individual images of the lenses array sub-apertures, providing a sharp cut-off referred to in the art as a top-hat or flat-top profile.

A second integrator is added to further improve homogenization, which is one of the characteristics of this invention.

To remove possible hotspots and obtain an even more uniform distribution profile, the beam may be diffused by a holographic refractive diffuser-exhibiting a custom-engineered surface-that provides a desired output angle and light transmittance above 97%.

Optical behavior and mechanical characteristics of microlenses and engineered diffusers are custom-designed and carefully tuned as well to achieve an excellent beam homogenization performance while minimizing loss of light.

Technical Problem

The invention aims to achieve a controlled, usually top-hat, intensity profile based on laser beam sources with non-uniform intensity, supporting incident Gaussian laser beam/s or other higher order multi-transverse modes in the visible, IR or UV spectrum.

Solution to Problem

The laser beam homogenizer-expander uses a first beam shaper element to divide the incident beams into beamlets along the main optical axis, and a second beam shaper element, that is, second light integrator which defines the top-hat intensity distribution output, thus providing a second homogenization stage.

The invention also encompasses several light diffusers, mirrors, filters, and output lenses.

Advantageous Effect of Invention

The invention provides a very accurate beam shaping performance with minimum light loss. Specifically, it achieves a good homogenization at the desired output angle, fully integrating/blending one or several wavelength laser sources such as red, green, blue, and/or other wavelengths in the visible/non-visible spectrum.

If multi-wavelengths are used as initial laser source, the light engine output provides a good homogenization and color blend, with almost no noticeable speckle, near top-hat intensity profile and no visible hot spots or interference patterns.

DETAILED DESCRIPTION OF THE INVENTION

The preferred embodiments of the present invention are described below, and the present invention will be more clearly and completely described with reference to the accompanying drawings.

Figure 1:
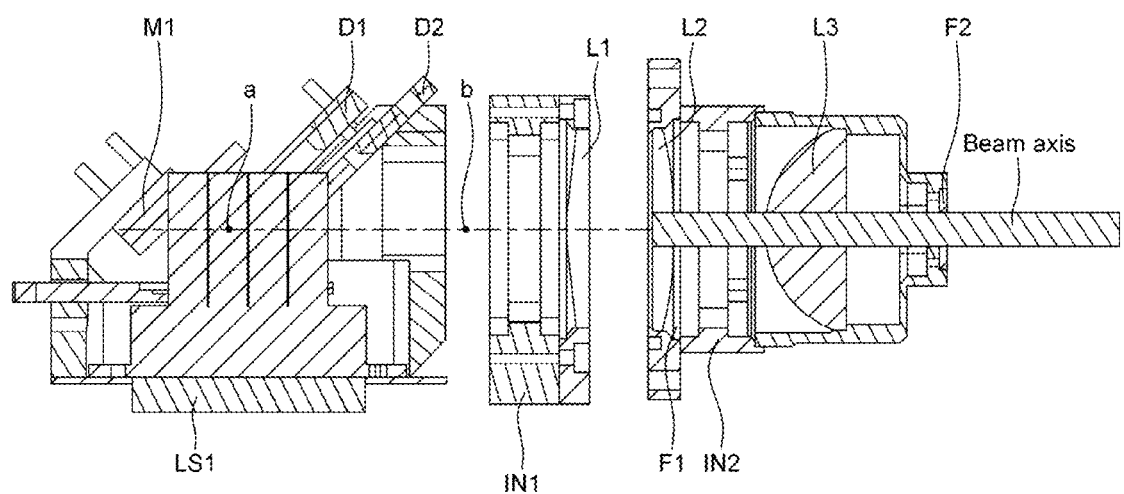
FIG. 1 is a schematic structural view showing all the beam path setup with all the optical components and an example of an RGB laser source.

FIG. 1 provides an overview of the beam propagation path within an optical device based on a red-green-blue laser source LS1. It is well understood that laser source LS1 may instead take the form of a single wavelength laser in the infrared, visible, and ultraviolet spectrum.

Laser source LS1 comprises a multi-die package (MDP) composed of packaged laser diodes LD1, LD2, LD3 with integrated ball collimators CL of short focus.

In the given example, peak wavelength of laser diode LD3 is in the red spectrum, while peak wavelength of laser diode LD2 is in the blue spectrum, and peak wavelength of laser diode LD1 is in the green spectrum, exemplifying a laser source suitable for visible-band applications. As mentioned above, other kinds of active medium lasers, including infrared or ultraviolet lasers, may be employed instead.

Figure 3:
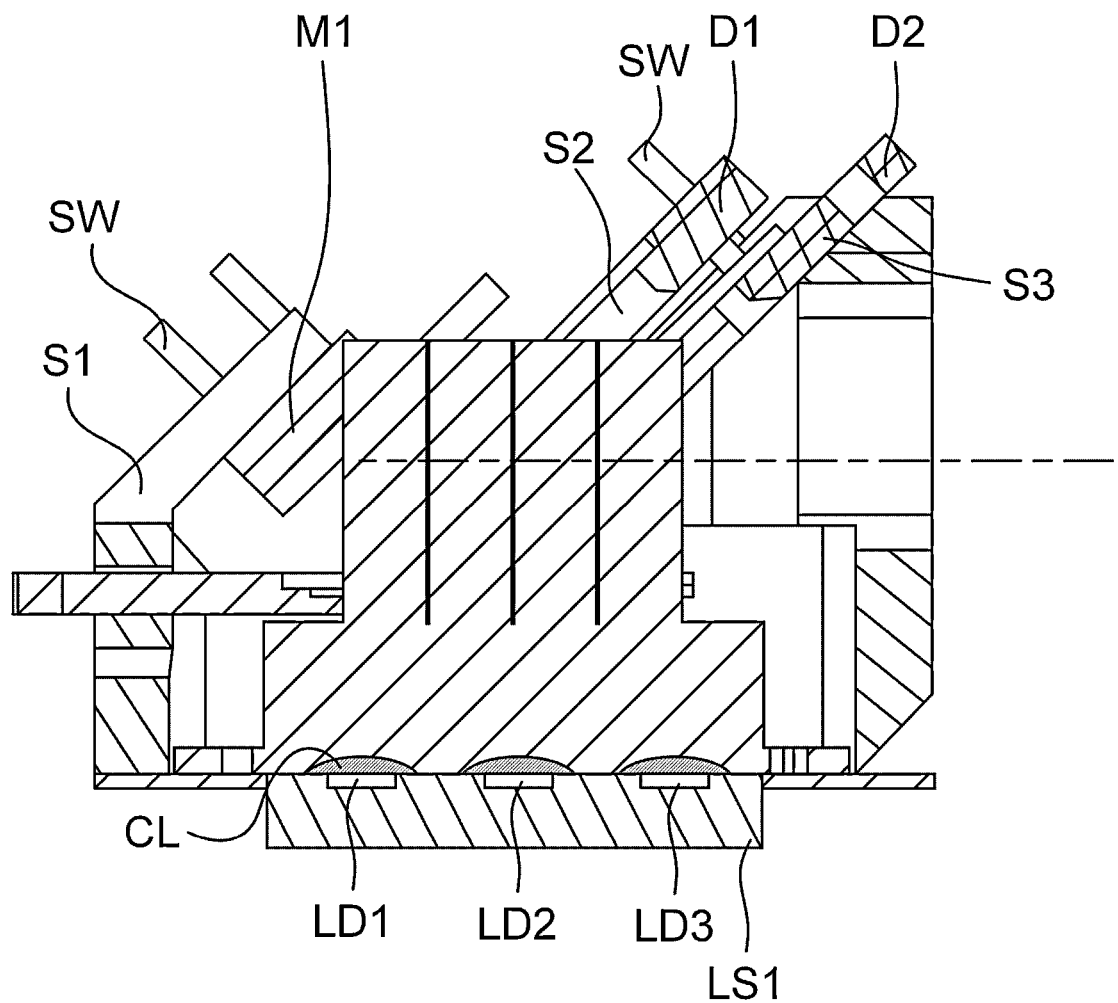
FIG. 3 Is a schematic diagram of a proposed laser source and its components.

As best seen in FIG. 3, laser source LS1, for improved integration, comprises several optical elements M1, D1, D2 whose purpose is to superimpose the beams from all laser diodes LD1, LD2, LD3 in the main optical axis, a technique commonly referred to as spectral incoherent combining.

Each optical element M1, D1, D2 is kept in place by an optics holder S1, S2, or S3, respectively, that is equipped with a push-pull screw SW to allow for fine adjustment of the respective optical element along three axes for superimposing all beams.

Dielectrically coated mirror M1 reflects the green light emitted by laser diode LD1 orthogonally toward a first integrator IN1.

Dichroic filter D1 selectively passes the green component while fully and orthogonally reflecting the blue light emitted by laser diode LD2.

Hence, when the beam passes the position marked "a", its green and blue components are incoherently combined and aligned in the near as well as far field.

Output dichroic filter D2 selectively passes the green and blue components emitted by laser diodes LD1 or LD2, respectively, while fully and orthogonally reflecting the red light emitted by laser diode LD3.

All dichroic layers are designed to obtain maximum transmittance and reflection at an angle of incidence of 45°.

At position "b", all three components are spectrally combined and aligned in the near and far field along the main optical axis, thus improving the homogenization performance of downstream integrators IN1 and IN2.

Figure 2:
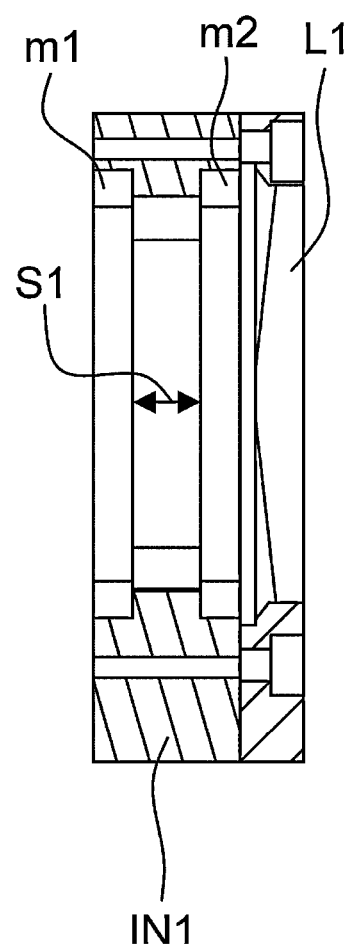
FIG. 2 Is a schematic diagram of an integrator and its components.

FIG. 2 shows the first integrator IN1 in additional detail, revealing two microlens arrays m1, m2. Both arrays may be identical, sharing the same pitch and a focal length that usually correspond to their mutual distance s1.

To avoid any overfilling of the lens aperture and ensuing loss of brightness, the diameter of individual beamlets at the downstream microlens array m2 falls short of its lens pitch. Such overfilling of the lens array might otherwise result in unwanted multiple images within the Fourier plane.

As has been mentioned, engineered surfaces may be employed instead of microlens arrays m1, m2 without impairing the objective of the invention.

Reverting now to FIG. 1, plano-convex spherical lens L1, taking the role of a Fourier lens, is trained on a second spherical plano-convex lens L2 which serves as a field lens. Depending on setup, lenses L1 and L2 may vary in focal length, but near-infinite focus—resulting in minimum divergence of the beam upon reaching the second integration stage-may generally be considered preferable.

A first holographic diffuser F1, engineered with a custom surface, reduces any hot spots or speckle while improving the blending of all wavelengths.

Thus diffused, the blended laser beam enters its second integration stage based upon second integrator IN2, which may share the specifications of first integrator IN1.

Downstream of second integrator IN2, a further field lens in the form of condenser lens L3 serves to shape the output beam into an inverted cone of desired angle θ, generally depending on the envisaged application or integration with any downstream optical device. Other than achieving said angle θ, focal length of integrator IN2 would appear largely noncritical.

A second holographic diffuser F2, again engineered with a custom surface, reduces any hot spots, speckle, or interference that might remain in the beam upon passing second integrator IN2, further improving the blending of all wavelengths and distribution profile of the final output beam.

INDUSTRIAL APPLICABILITY

The invention is applicable throughout the entertainment industry. Its benefits further apply over a wide range of other applications that can be broadly classed as "illumination", including machine vision, inspection, medical uses, etc. Specifically, the invention is useful for applications like microscopy, material processing, fluorescence, lighting fixtures, holography, fiber coupling, etc., where spectral properties of laser light is required (narrowband, monochromaticity) but a uniform distribution of the intensity is necessary at the same time.

REFERENCE SIGNS LIST

LS1 Laser source
LD1, LD2, LD3 Laser diodes
CL Collimators
M1 Mirror
D1, D2 Dichroic filters
S1, S2, S3 Holders
SW Screws
IN1, IN2 Integrators
m1, m2 Microlens arrays
s1 Distance L1, L2, L3 Lenses
F1, F2 Diffusers
θ Angle
a, b Reference positions

The invention claimed is:

1. An optical device, comprising:
a laser source configured to emit a plurality of beams,
a first integrator for splitting a co-aligned version of the emitted beams into beamlets and
a second integrator, arranged coaxially to the first integrator, for shaping the beamlets into an output beam of a flat-top spatial irradiance profile, wherein
the first integrator and the second integrator each comprise two microlens arrays of equal focal length, the arrays being coaxially juxtaposed at a distance,
wherein the optical device further comprises two spherical plano-convex lenses arranged between the first integrator and the second integrator, the plano-convex lenses being coaxially juxtaposed with facing planar sides, and
wherein the optical device further comprises a first diffuser arranged between the plano-convex lenses and the second integrator.

2. The device of claim 1, further comprising a condenser lens arranged downstream of the second integrator for shaping the output beam into a cone of a defined angle.

3. The device of claim 2, further comprising a second diffuser arranged downstream of the condenser lens.

4. The device of claim 3, wherein the first diffuser is a holographic diffuser, and wherein the second diffuser is a holographic diffuser.

5. The device of claim 1, wherein the laser source comprises a first laser diode for emitting a first beam among the beams at a first wavelength.

6. The device of claim 5, wherein the laser source comprises a mirror for reflecting the first beam toward the first integrator.

7. The device of claim 6, wherein the laser source comprises a second laser diode for emitting a second beam among the beams at a second wavelength other than the first wavelength.

8. The device of claim 7, wherein the laser source comprises a first dichroic filter for passing the first beam while reflecting the second beam toward the first integrator such that the first and second beam are co-aligned at a first position between the first dichroic filter and integrator.

9. The device of claim 8, wherein the laser source comprises a third laser diode for emitting a third beam among the beams at a third wavelength other than the first and second wavelengths.

10. The device of claim 9, wherein the laser source comprises a second dichroic filter for passing the first and second beams while reflecting the third beam toward the first integrator such that all beams are co-aligned at a second position between the second dichroic filter and integrator.

11. The device of claim 10, wherein the laser source comprises optics holders retaining the mirror (M1) and dichroic filters.

12. The device of claim 11, wherein the optics holders each have a push pull screw for spatial alignment.

13. The device of claim 10, wherein
the first wavelength is a blue wavelength,
the second wavelength is a green wavelength,
the third wavelength is a red wavelength,
the mirror is configured to reflect the first beam orthogonally toward the first integrator,
the first dichroic filter is configured to reflect the second beam orthogonally toward the first integrator, and
the second dichroic filter is configured to reflect the third beam orthogonally toward the first integrator.

14. The device of claim 5, wherein each laser diode integrates a short-focus collimator.

15. The device of claim 14, wherein the diodes and collimators form a multi-die package.

16. The device of claim 1, wherein the arrays are coaxially juxtaposed at a distance equaling the focal length, and wherein the first diffuser is a holographic diffuser.

* * * * *